United States Patent
Sheahan, Jr. et al.

(10) Patent No.: US 9,347,535 B1
(45) Date of Patent: May 24, 2016

(54) FAULT TOLERANT ELECTRO-MECHANICAL ACUTATOR

(71) Applicant: The Boeing Company, Chicago, IL (US)

(72) Inventors: James L. Sheahan, Jr., Alton, IL (US); Chalres E. Morris, St. Louis, MO (US); David E. Blanding, Hawthorne, CA (US); James L. Peck, Jr., Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 407 days.

(21) Appl. No.: 13/932,253

(22) Filed: Jul. 1, 2013

Related U.S. Application Data

(62) Division of application No. 12/487,404, filed on Jun. 18, 2009, now Pat. No. 8,499,653.

(51) Int. Cl.
  *F16H 25/20* (2006.01)

(52) U.S. Cl.
  CPC ..................................... *F16H 25/20* (2013.01)

(58) Field of Classification Search
  CPC ....... F16H 25/20; F16H 25/025; F16H 35/10; F16H 2035/103; Y10T 29/49638; Y10T 29/49721; Y10T 29/49748; B23P 6/00; B64C 13/50; F05D 2270/62
  USPC ............ 74/89.23, 89.25, 89.26, 89.36, 89.38, 74/424.78, 424.79; 244/99.9; 310/80; 192/56.1, 56.3, 56.4, 56.5, 71, 150; 188/72.7, 72.8, 156, 265; 29/407.02
  See application file for complete search history.

(56) References Cited

U.S. PATENT DOCUMENTS

| | | | | |
|---|---|---|---|---|
| 2,930,212 A | * | 3/1960 | Walterscheid-Muller | F16D 7/048 192/56.1 |
| 2,978,082 A | * | 4/1961 | Better | B25B 23/141 192/56.5 |
| 4,417,650 A | * | 11/1983 | Geisthoff | F16D 43/2028 192/56.1 |
| 4,858,491 A | * | 8/1989 | Shube | B64C 13/42 192/141 |
| 5,195,721 A | * | 3/1993 | Akkerman | F16D 27/105 192/56.1 |
| 6,237,433 B1 | * | 5/2001 | Rodrigues | B64C 13/50 188/67 |
| 6,896,621 B2 | * | 5/2005 | Carstensen | F16D 43/2028 192/56.1 |
| 7,834,494 B2 | * | 11/2010 | Blanding | B64C 13/00 310/112 |
| 8,499,653 B1 | * | 8/2013 | Sheahan, Jr. | F16D 11/16 188/156 |
| 2005/0252318 A1 | * | 11/2005 | Corney | B64C 13/28 74/89.23 |

* cited by examiner

*Primary Examiner* — David Bryant
*Assistant Examiner* — Steven A Maynard
(74) *Attorney, Agent, or Firm* — Felix L. Fischer

(57) ABSTRACT

An electromechanical actuator incorporates a drive housing connected to a motor for rotational motion. A screw is employed with an actuating nut having protruding engagement bosses and a drive coupling is concentrically received within the drive housing having segments equal to the number of engagement bosses. Each segment has a cavity to receive a respective one of the engagement bosses and the segments are cooperatively positionable from an active position radially compressed to engage the bosses within the cavities to a released position radially expanded to disengage the bosses from the cavities.

20 Claims, 15 Drawing Sheets

FAULT TOLERANT ELECTRO-MECHANICAL ACUTATOR

REFERENCE TO RELATED APPLICATIONS

This application is a divisional application of U.S. application Ser. No. 12/487,404 entitled FAULT TOLERANT ELECTRO-MECHANICAL ACUTATOR having a common assignee as the present application, the disclosure of which is incorporated herein by reference.

BACKGROUND INFORMATION

1. Field

Embodiments of the disclosure relate generally to the field of electro-mechanical actuators and more particularly to embodiments for releasing a segmented drive coupling that disengages the ball screw from the actuator gear.

2. Background

Actuators provide mechanical force for moving or controlling elements of a mechanical structure. Aircraft, for example, employ actuators for control surfaces such as the rudder and elevators in the empennage of the aircraft and flaps, spoilers and ailerons in each wing. Actuators are additionally employed in the fuselage to open and close the doors that cover the landing gear bays, to raise and lower the landing gear and to deploy engine control thrust reversers for supplementing brakes during deceleration of the aircraft on landing. Actuators are required for similar use on marine and land vehicles for various mechanical systems.

In addition to uses in aircraft and other vehicles, actuators are used in electro-mechanical devices such as computer disk drives to control the location of the read/write head by which data is stored on and read from the disk. Actuators are used in robots, i.e., in automated factories to assemble products. Actuators operate brakes on vehicles; open and close doors; raise and lower railroad gates and perform numerous other tasks in various fields of use.

Hydraulic actuators have been historically used for many applications including aircraft flight controls and subsystems such as landing gear. However, electrically driven actuators which avoid the requirement for plumbing to distribute and control a pressurized working fluid are being used in larger numbers of applications to replace hydraulic actuators. For example, in an airplane, a pump that generates high-pressure working fluid and the plumbing required to route the working fluid may add weight and increase design complexity because of the hydraulic lines. Additionally, connectors on the lines may provide multiple failure points which are avoided with electrical actuators. Electric actuators, which are powered and controlled by electric energy, require only wires to energize and control the unit.

Electro-mechanical actuators (EMA's) are devices that are responsible for moving a mechanical device, and are controlled electrically using sensors for feedback. Linear EMA's are now found in a wide variety of industrial, scientific, and commercial applications, and are used where thrust, speed or position must be controlled. In general, linear EMA's are self-contained systems that convert rotary motion from a motor to linear motion. The actuators are typically operated by an electric motor. Linear motion systems driven by rotating electric motors often employ screw drive systems where the motor rotates a ball screw, lead screw or acme screw, which translates the torque provided by the motor into extension or retraction force through or along the screw.

Some linear EMA's use ball screws for positioning. Such actuators contain a ball screw assembly. Typically, this ball screw assembly consists of a ball screw with a helical groove; a ball nut, also known as the outer race, with an internal groove; and one or more circuits of balls that recirculate in the grooves between the ball screw and the ball nut. This anti-friction design converts torque to linear force as either the ball screw or the ball nut turns and the other component moves in a linear direction.

Other actuators use lead screws in their operation. The lead screw typically uses a plastic or bronze roller nut that slides along the threads of the screw, much like an ordinary nut and bolt. Since there are no rolling elements between the nut and the screw the drive mechanism is simplified.

Windings of electrical motors may be damaged and bearings on motor shafts may wear out. The transmission between the motor and the load, typically the screw and drive arrangement, is also a potential wear point. Such wear may result in mechanical malfunctions may create a jam and prevent motion of the actuator screw. Fault tolerance for these types of malfunctions is therefore necessary in EMA systems to provide equivalent capabilities with redundant hydraulic systems.

It is therefore desirable to provide a release mechanism in the actuator drive train which disconnects the electromechanical actuator from the load upon the occurrence of a jam thus allowing the controlled element to free float or allow redundant actuators freedom of movement in control of the load. In an exemplary aircraft application in the event of a jammed system, the actuator drive train is disengaged allowing a flight control surface to move to a faired position or in the event of a jam in a landing gear actuator disengagement of the EMA drive train allows the gear to freefall to its down and locked position.

SUMMARY

Exemplary embodiments provide a jam release system for an electromechanical actuator which incorporates a screw and actuating nut. A segmented expandable drive coupling engages the actuating nut in a first active position and releases the nut in a second expanded position. A release mechanism, responsive to a signal indicating a jam or other malfunction, maintains the drive coupling in the first position and upon receipt of the signal releases the drive coupling.

In representative configurations, an electromechanical actuator which incorporates the exemplary release system includes a drive housing connected to a motor for rotational motion. The screw is employed with an actuating nut having protruding engagement bosses and a drive coupling is concentrically received within the drive housing having segments equal to the number of engagement bosses. Each segment has a cavity to receive a respective one of the engagement bosses and the segments are cooperatively positionable from an active position radially compressed to engage the bosses within the cavities to a released position radially expanded to disengage the bosses from the cavities.

To accomplish cooperative positioning, each segment in the drive coupling has first and second opposing grooves in circumferential alignment and a plurality of push plates received for sliding motion in the first groove and second groove, respectively, of adjacent segments. The push plates have a first position retaining the segments in the active position and a second position releasing the segments into the expanded position. A plurality of release pins extend radially inward from an inner surface of the drive housing engaging each push plate in the first position. Upon sliding of the push plates in the grooves to the second position, the release pins align with a release hole in the push plate allowing radial expansion to the released position for the drive coupling. A cylindrical piston aligned with and engaging the push plates provides the sliding motion from the first position to the second position. The push plates each incorporate a tab extending from the grooves of the segments in the first position. The piston contacts the tabs in the extended position, and upon moving responsive to the jam indication signal pushes on the tabs to slide the push plates into the second position. To expand the segments, each segment in the drive coupling has first and second opposed slots in circumferential alignment and springs are received in the first and second slots, respectively, of adjacent segments. The springs are compressed in the active position and urge the segments into the expanded position upon sliding of the push plates to the second position.

The electromechanical actuator transfers rotational motion of the motor to the lead screw with each segment incorporating a torque engagement slot in an outer semi-cylindrical surface. The housing incorporates torque ribs extending from an inner surface of the housing in alignment with a respective torque engagement slot. For the exemplary embodiments, a ring gear circumferentially extends from the housing for connection to the motor.

The features, functions, and advantages that have been discussed can be achieved independently in various embodiments of the present invention or may be combined in yet other embodiments further details of which can be seen with reference to the following description and drawings

DETAILED DESCRIPTION

Figure 1:
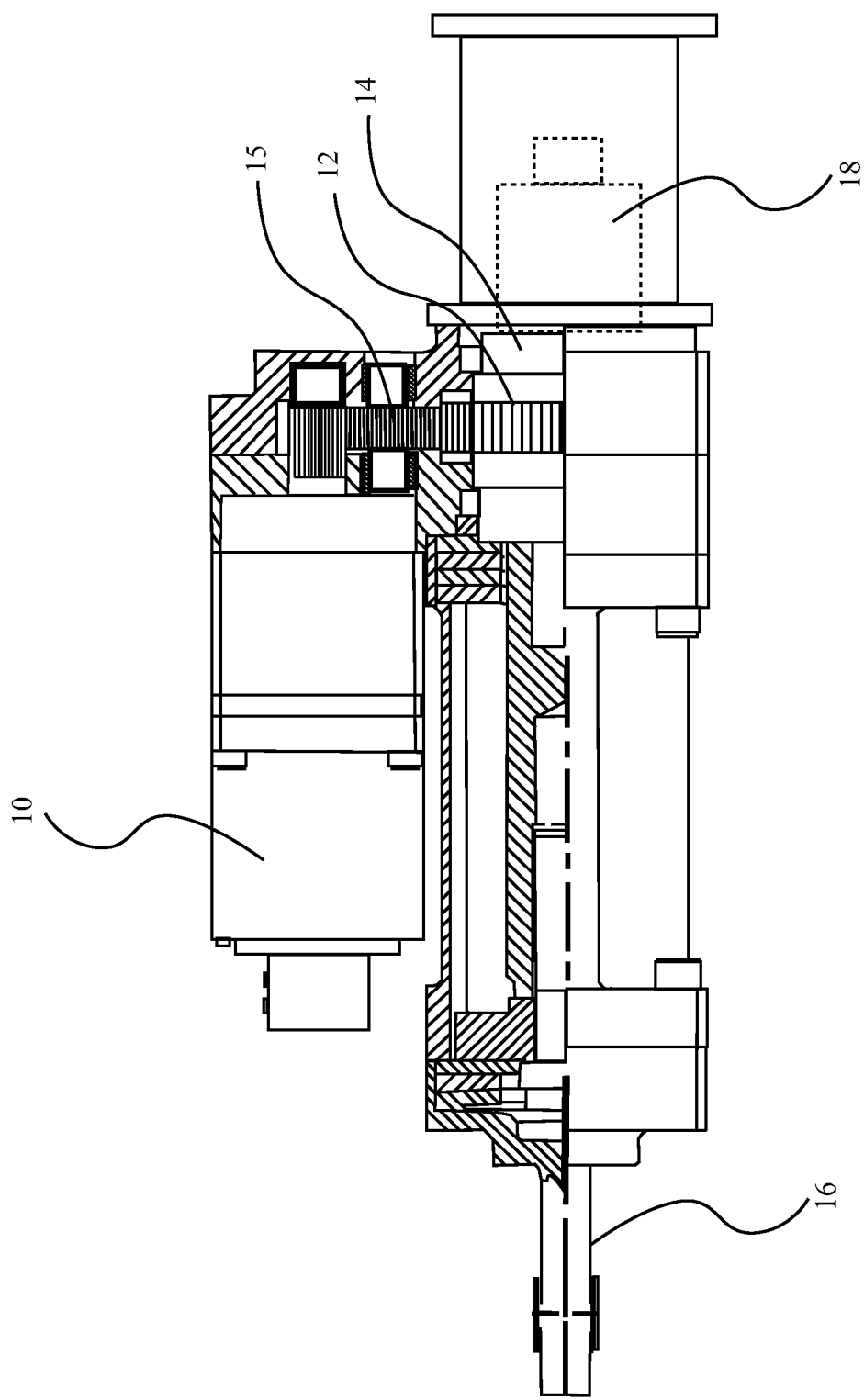
FIG. 1 is section schematic view of an electro mechanical actuator (EMA) system of a first described embodiment with the disengagement device shown excluding the activating cylinder.

The embodiments described herein demonstrate a linear EMA which is releasable under jam conditions having an electric motor 10 as shown in FIG. 1, driving a ring gear 12 circumferentially attached to an actuator screw drive housing 14. A gear train 15 may be employed for mechanical advantage and matching rotational speed. Rotation of the drive housing 14 by the motor drives a screw 16, which in various embodiments may be a lead screw, ball screw or acme screw, for linear extension and retraction of the screw. Attachment of the screw to a mechanical system to be actuated such as an aerodynamic control surface can be accomplished through conventional means known in the art. For this configuration, a jam release activating cylinder and adapter for the activating actuator system 18 is provided and shown external to the system but could be incorporated into the EMA, as will be described in greater detail subsequently.

Figure 2A:
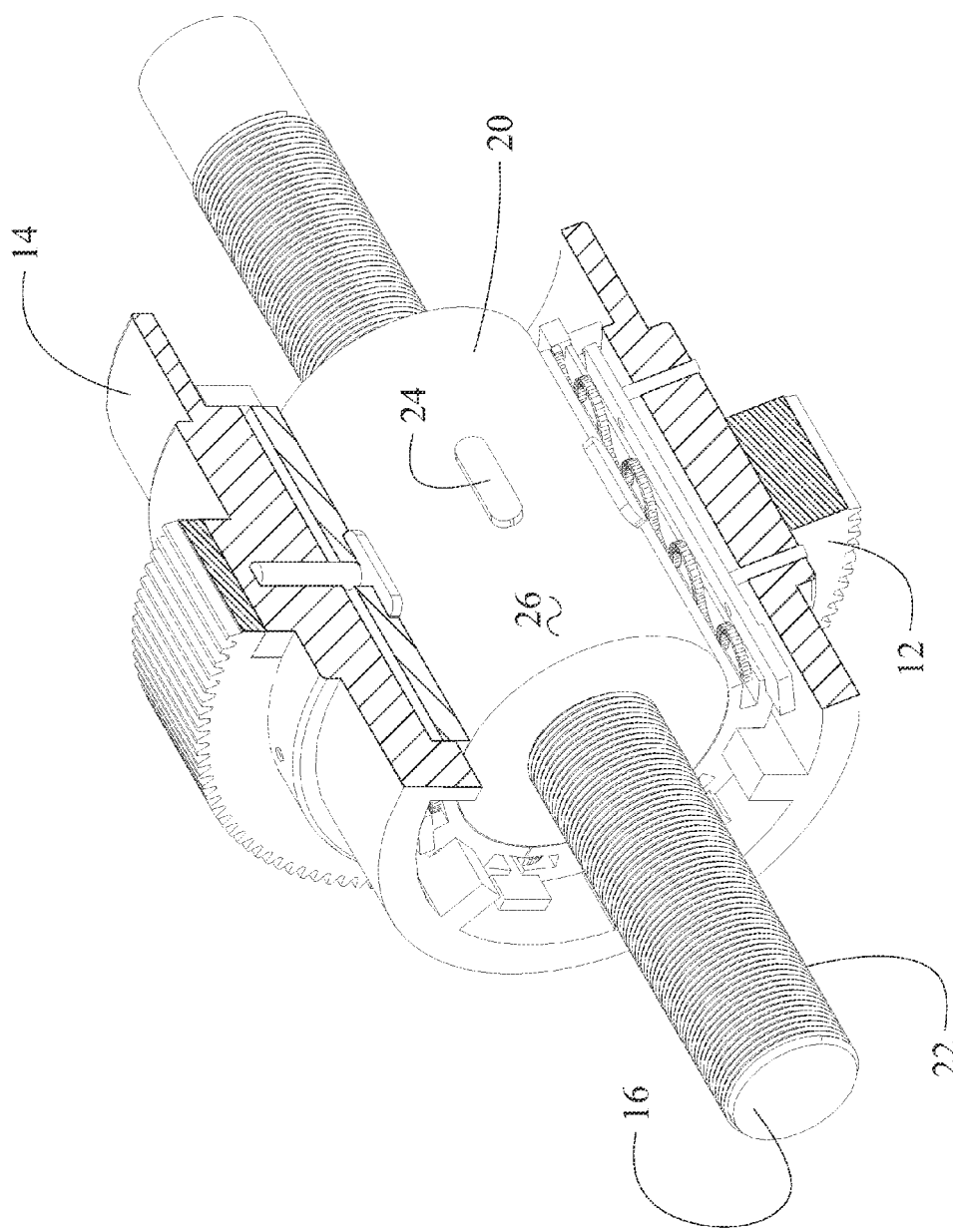
FIGS. 2A and 2B are a partial section isometric and side view of the EMA of the exemplary disengagement device embodiment.
Figure 2B:
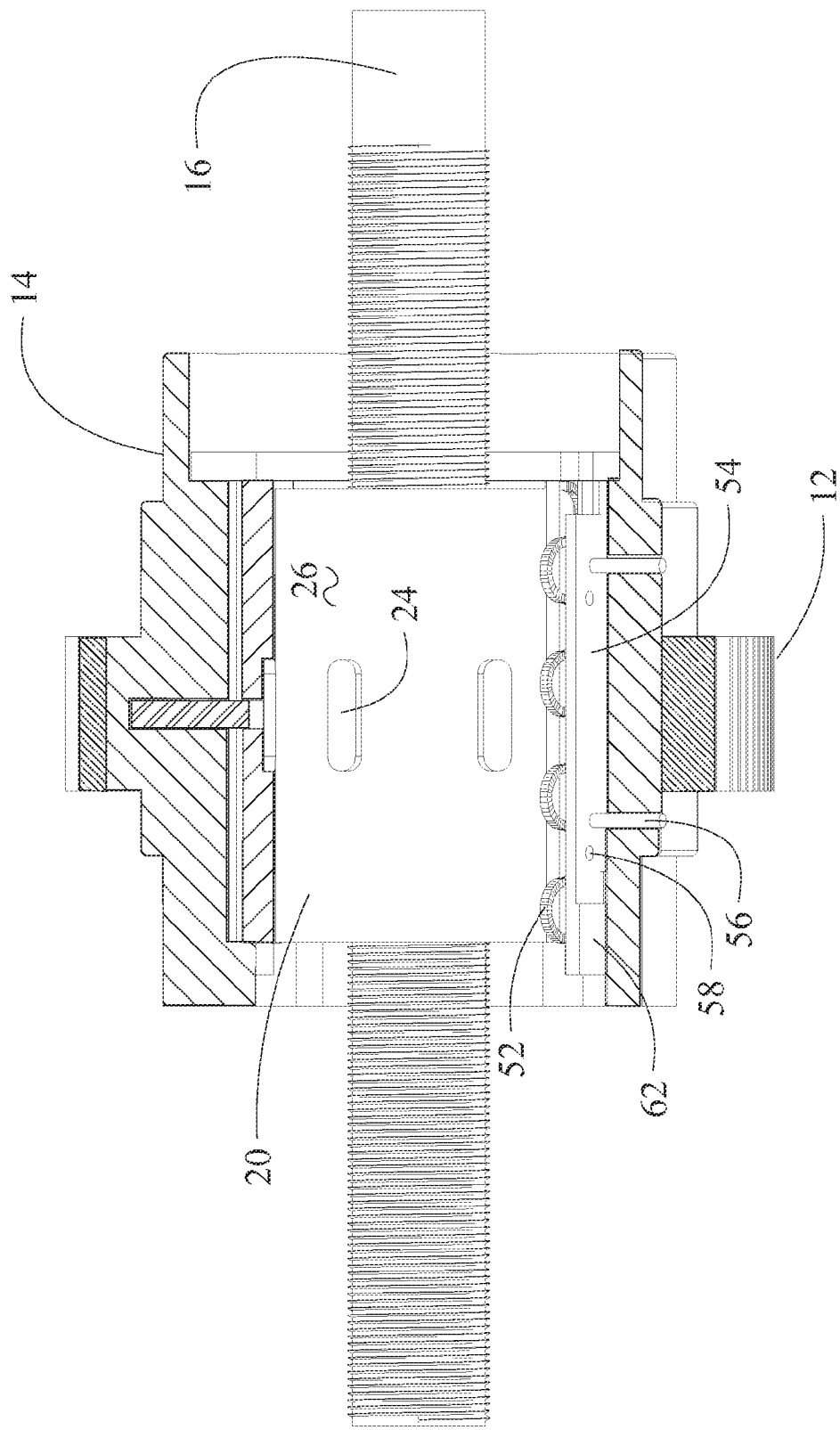
Figure 3A:
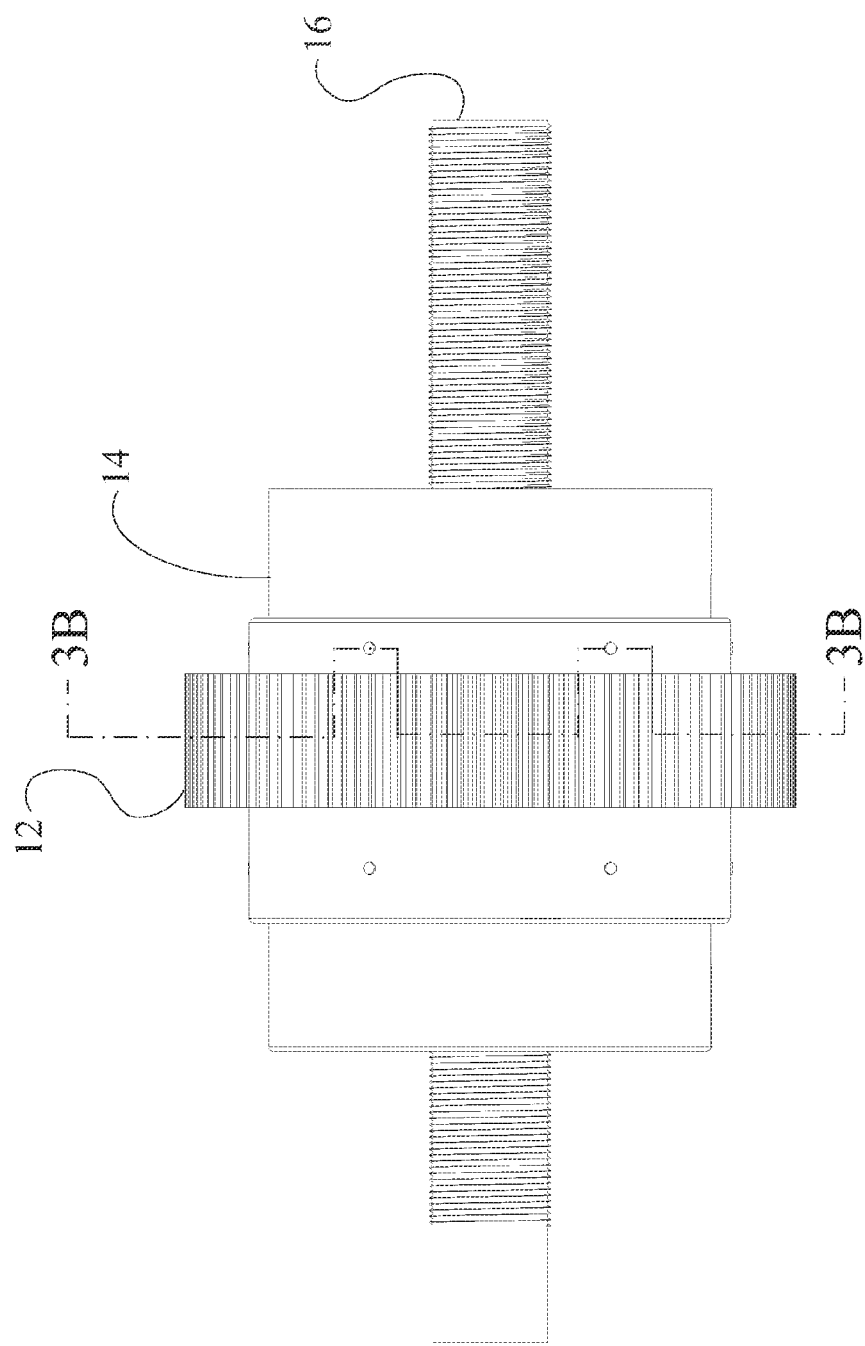
FIGS. 3A and 3B are a top view and an end section view along line 3B-3B of the disengagement device of FIGS. 2A and 2B.
Figure 4:
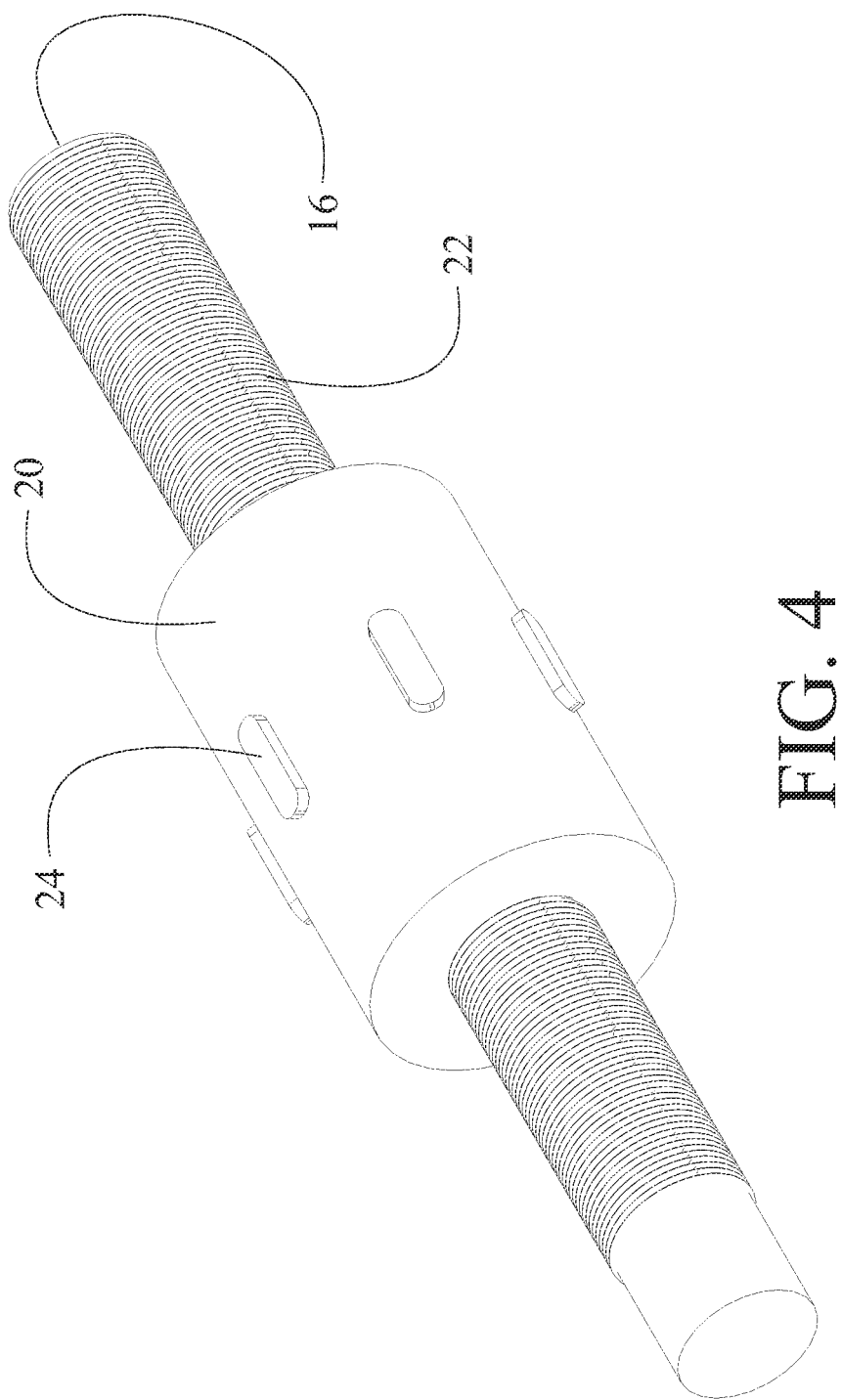
FIG. 4 is an isometric view of the actuator ball nut and screw.
Figure 5B:
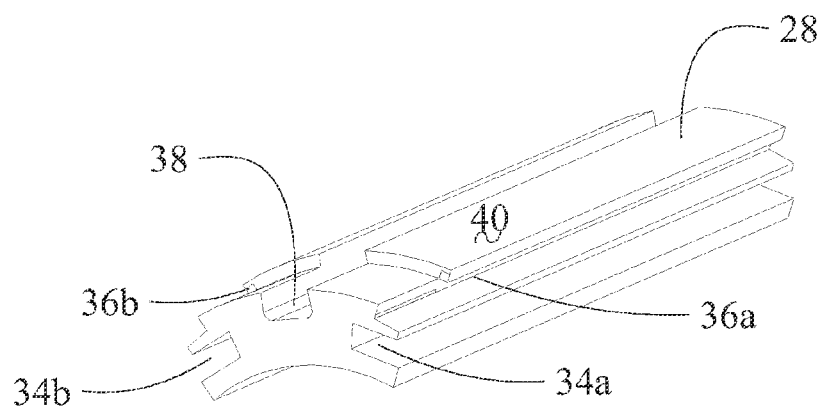
FIGS. 5A and 5B are top and bottom isometric view of the engagement segments of the drive coupling.
Figure 5A:
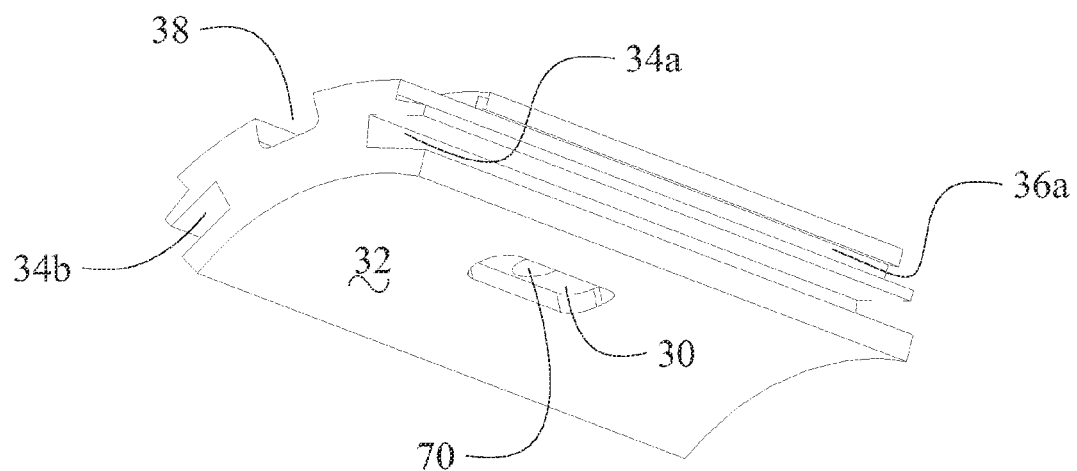
Figure 6:
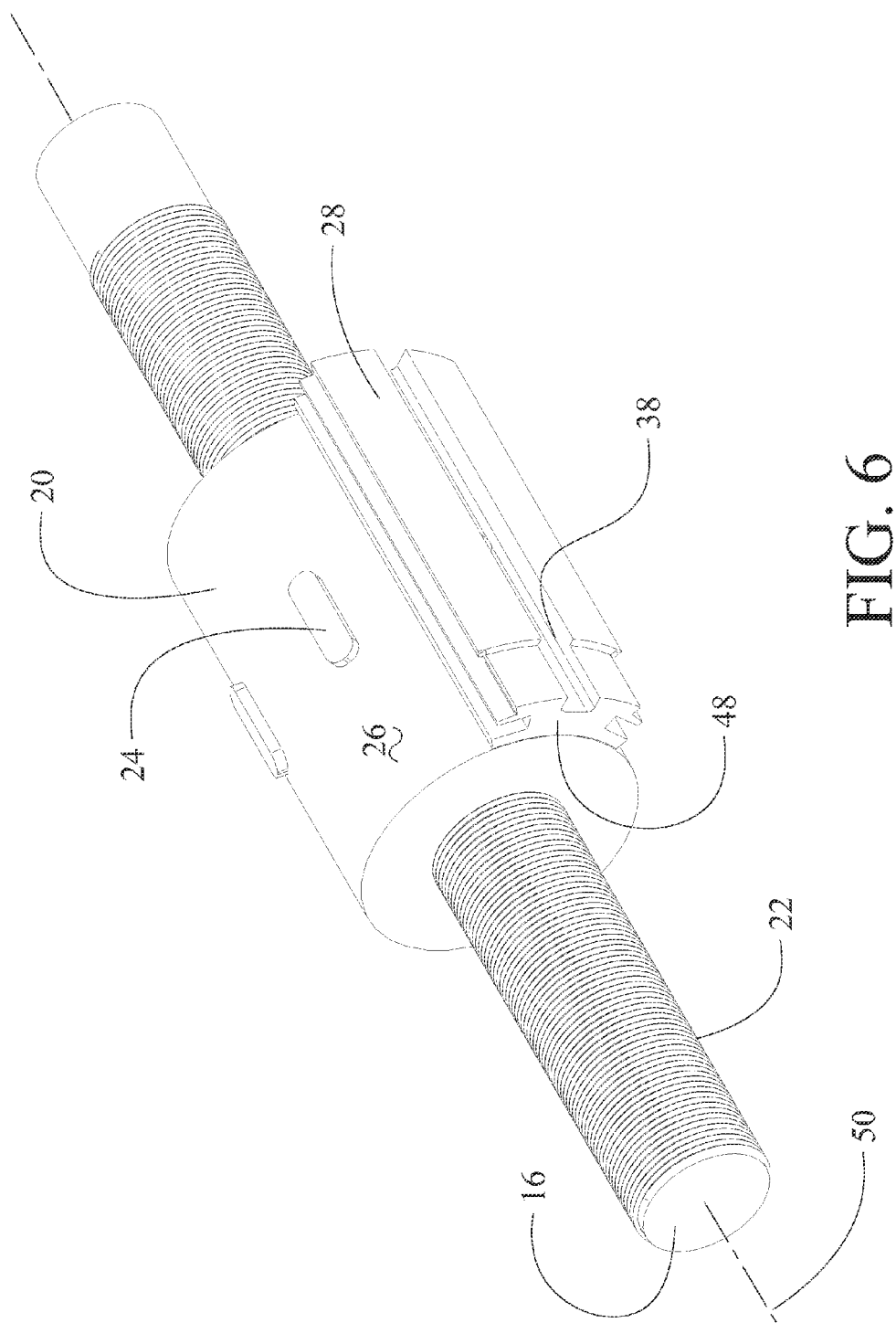
FIG. 6 is an isometric view of the actuator nut and screw with one engagement segment.
Figure 7:
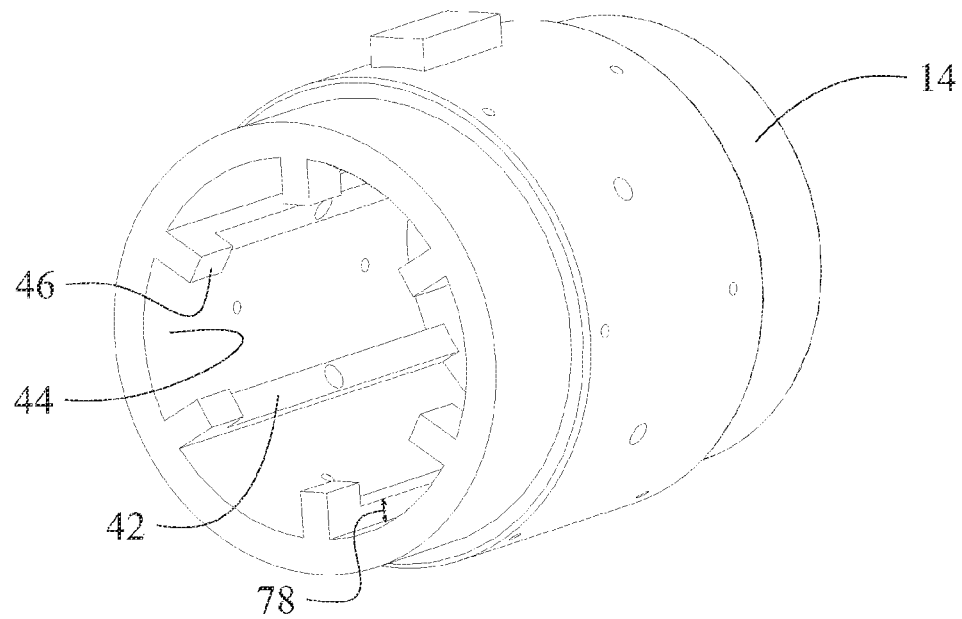
FIG. 7 is an isometric view of the EMA housing.

As shown in FIGS. 2A, 2B and 3, drive housing 14 carries an actuating nut 20, which in various embodiments may be a lead screw nut or a ball nut, operationally engages the threads 22 of screw 16 such that rotation of the actuating nut extends or retracts the screw. Details of the actuating nut and screw are shown in FIG. 4. The actuating nut 20 includes bosses 24 spaced in angular relation around the exterior surface 26 of the actuating nut. For the embodiment shown, six bosses spaced at 60° intervals are employed. Returning to FIGS. 2A, 2B and 3, six engagement segments 28 are carried within the drive housing 14 concentric to the actuating nut 20 as a drive coupling. While a drive coupling of six segments 28 and associated bosses 24 are shown in the embodiments in the drawings, any number of releasable segments may be employed. As shown in detail in FIG. 5A, each segment 28 incorporates a cavity 30 in a semi-cylindrical inner surface 32 to receive a mating boss 24 on the actuating nut 20. A segment located engaged on the actuating nut is shown in FIG. 6. The segments 28 are separated by resilient members, described subsequently, to expand radially upon activation of the jam release activating system to disengage the bosses 24 from the cavities 30 to release the actuating nut 20. For the embodiment shown in the drawings, opposing spring retention slots 34a and 34b, best seen in FIG. 5A, and opposing push plate grooves 36a and 36b provide positioning functionality for the cooperating six segments of the drive coupling as will be described in greater detail subsequently. Additionally, each segment 28 has a torque engagement slot 38 in a semi-cylindrical outer surface 40, best seen in FIG. 5B. Each torque engagement slot 38 receives a mating torque rib 42 extending from a cylindrical inner surface 44 of the drive housing 14 as best seen in FIG. 7 which shows the details of drive housing 14 without the mated inner components. For the embodiment shown, the torque ribs 42 each terminate in a dog leg 46 which constrains an edge 48 of the associated segment in the longitudinal direction parallel to an axis 50 of the screw as shown in FIG. 6.

Figure 3B:
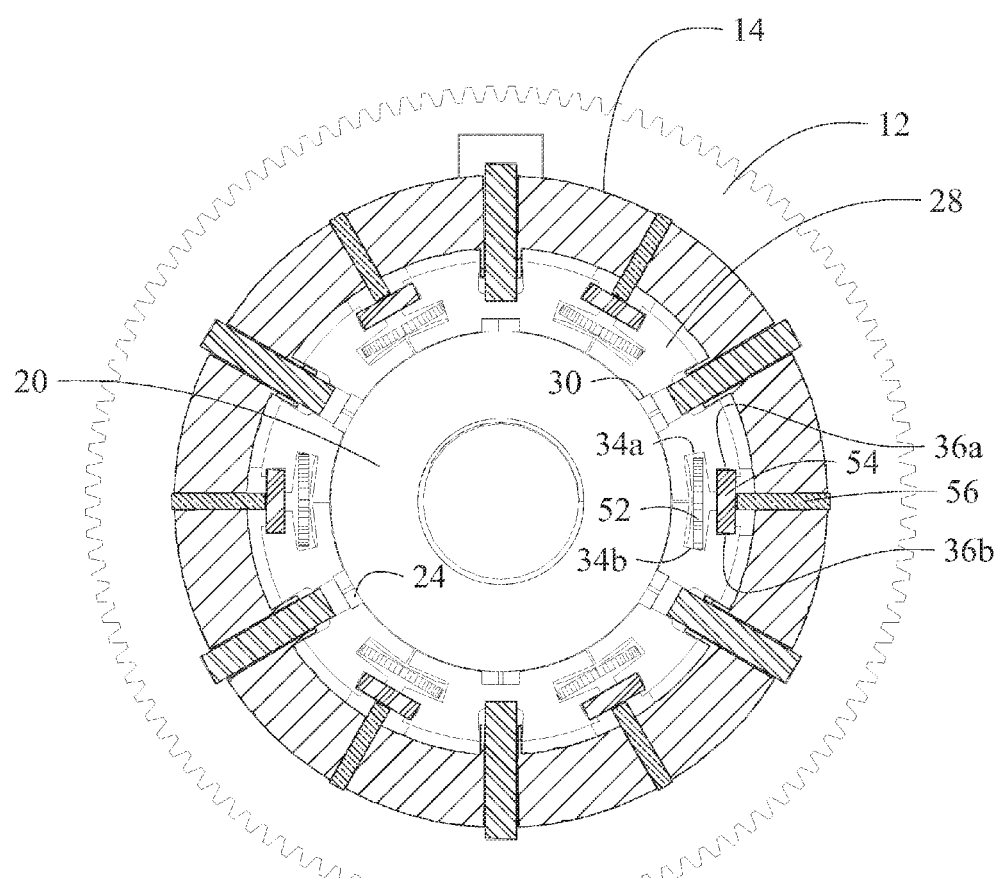
Figure 8:
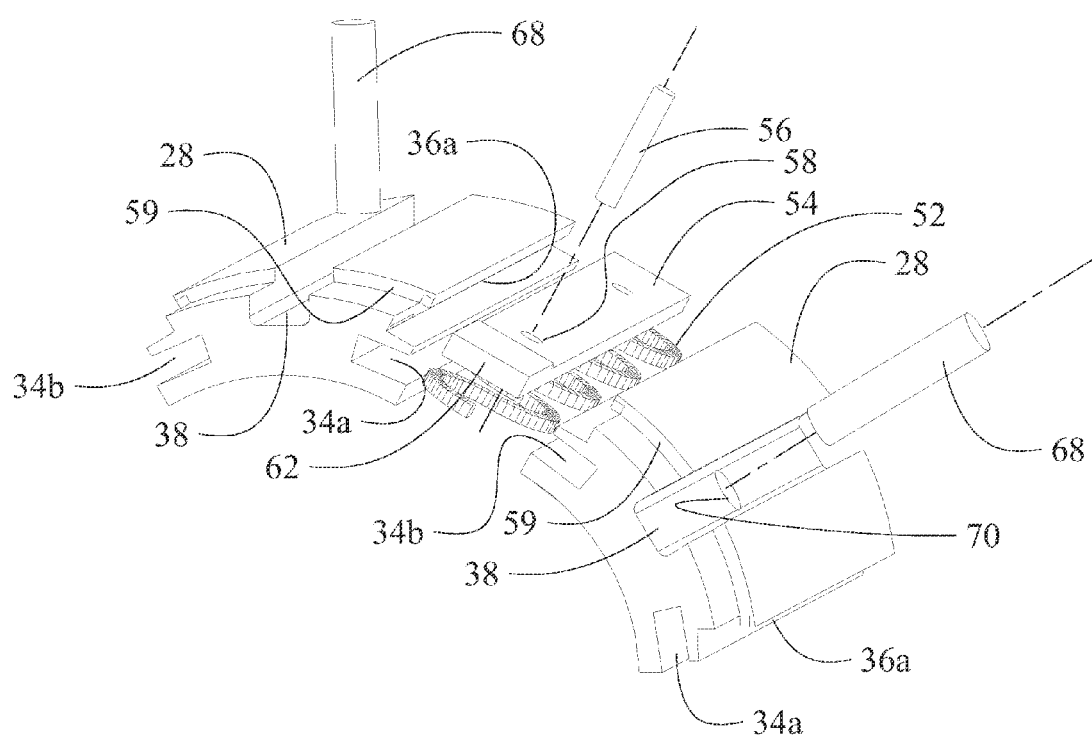
FIG. 8 is an exploded view of the actuator drive coupling segments, push plate, separation spring, release pin and blocking pins.

As best seen in the section view of FIG. 3B and the exploded view of FIG. 8, separation springs 52 are received in the spring retention slots of adjacent segments in the assembled position to act as the resilient expanding members and push plates 54 are received in the push plate grooves 36a and 36b of adjacent segments. In a first position of the push plates 54 corresponding to the active position as shown in FIG. 3B, radial pressure is maintained against the push plates 54 by release pins 56 which extend radially through the inner surface 44 of the drive housing 14 to engage the push plates 54. In the active position, the drive coupling segments 28 are maintained by the push plates 54 in radially compressed position with respect to the actuating nut 20, in close proximity to or engaging the outer circumference of the exterior surface 26 and receiving bosses 24 in the respective cavity 30 to impart torque for rotation of the actuating nut 20. While the segments in the active position are spaced from inner surface 44 of the drive housing 14, torque ribs 42 extending from that surface are received in torque engagement slots 38 in the corresponding segment to transfer torque imparted by the motor acting on ring gear 12 from the drive housing 14 to the segments 28. Drive continuity from the motor to the screw is thereby provided for operation of the EMA.

Figure 9:
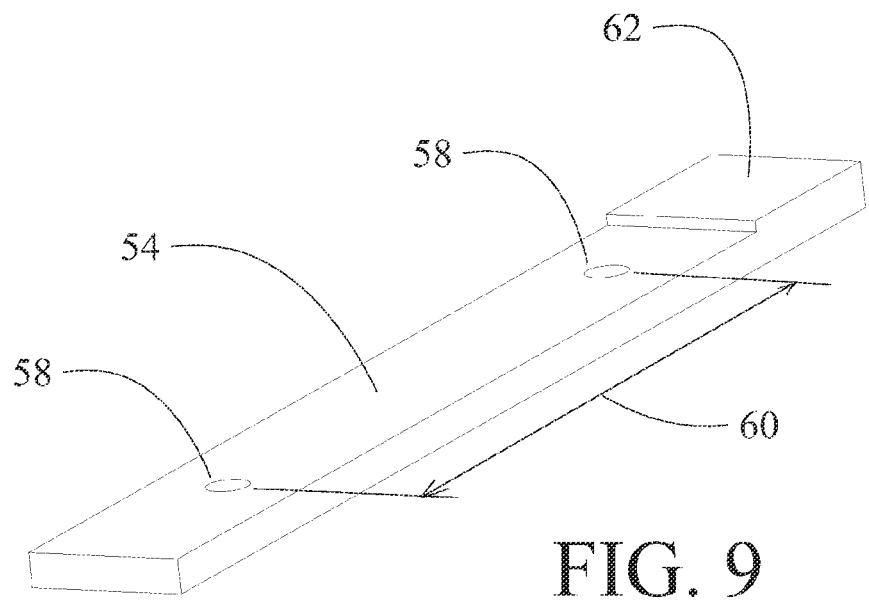
FIG. 9 is an isometric view of one push plate.
Figure 10:
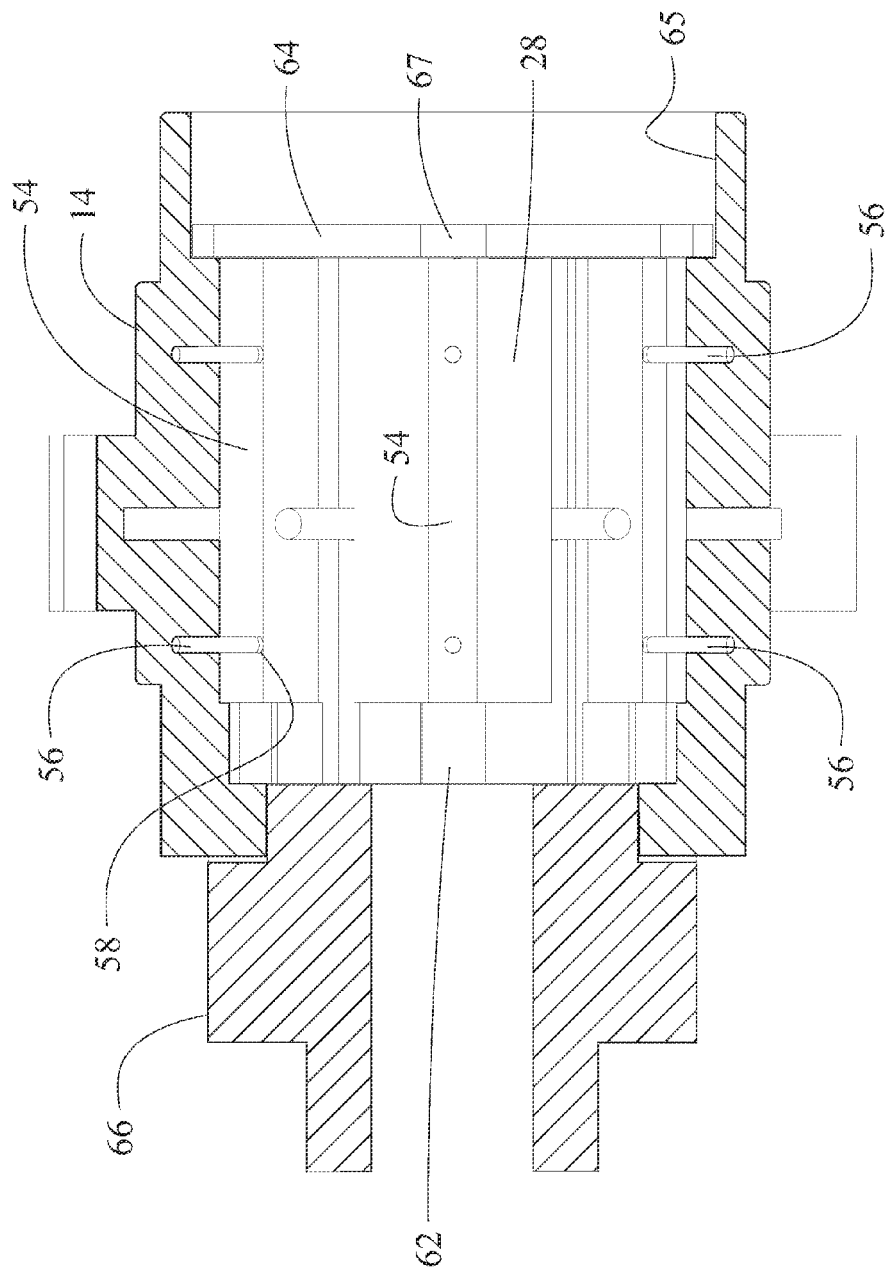
FIG. 10 is a side section view of the drive housing showing the release piston.

Each push plate 54, as shown in detail in FIG. 9, incorporates release holes 58 which are placed in spaced relation along the push plate 54 at a dimension 60 equivalent to the spacing of the release pins 56. An end tab 62 on each push plate 54 extends beyond edge 48. A cylindrical piston 66 shown in FIG. 10 provided as an element of the release activating system is aligned with and engages the end tabs 62 and, upon operation of the release activating system as will be described in greater detail subsequently, urges the push plates 54 longitudinally in the segment grooves 36a, 36b to a second position by depressing the end tabs 62 axially into the segments 28. In the second position, holes 58 align with release pins 56. End tabs 62 additionally function as a stop by engaging an indented flat 59 on the segment 28 which assures alignment of the pins 56 and holes 58. For the embodiments shown in the drawings two holes 58 and two corresponding release pins 56 are employed with respect to each push plate 54. In alternative embodiments additional release pins 56 and holes 58 may be employed and in certain embodiments a single release pin and receiving hole 58 may be used. For the embodiment shown, a washer 64 secures segments 28 within the drive housing 14. A lock nut (not shown) having external threads may be employed to close bore 65 restraining the washer 64. The washer 64 employs cutouts 67 allowing clearance for the torque rib 42, as necessary. Upon alignment of the release pins 56 and holes 58, the radial force maintaining the push plates 54 and, in turn, the segments 28 against the actuation nut 20, is released. Separation springs 52 constrained in opposing spring slots 34a and 34b in adjacent segments urge the segments apart circumferentially which then translates into radial displacement of the segments 28. The drive coupling segments 28 therefore cooperatively radially expand against the inner surface 44 of the drive housing 14. Radial displacement of the segments 28 releases bosses 24 on the actuating nut 20 from the corresponding cavity 30 in each segment 28 thereby allowing the actuating nut 20 and screw 16 to be released from rotational connection to the drive housing 14. For the embodiment shown, wave springs are employed as separation springs 52. However, in alternative embodiments other forms of resilient members including helical springs or leaf springs may be employed.

Figure 11A:
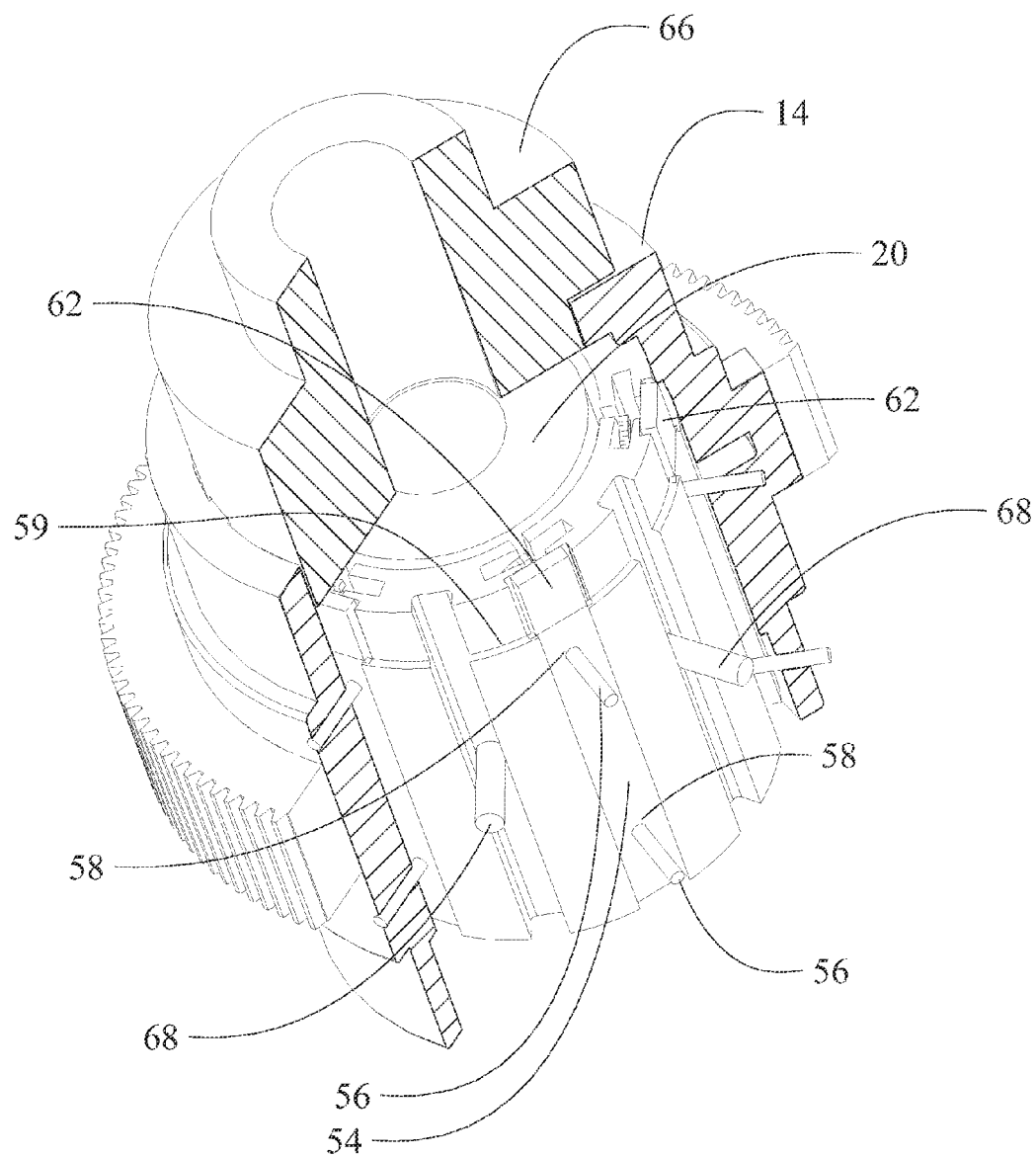
FIGS. 11A, 11B and 11C are and isometric partial section view, an end section view showing the expanded position of the segments after release; and a detailed partial section view along line 11C in FIG. 11B.
Figure 11B:
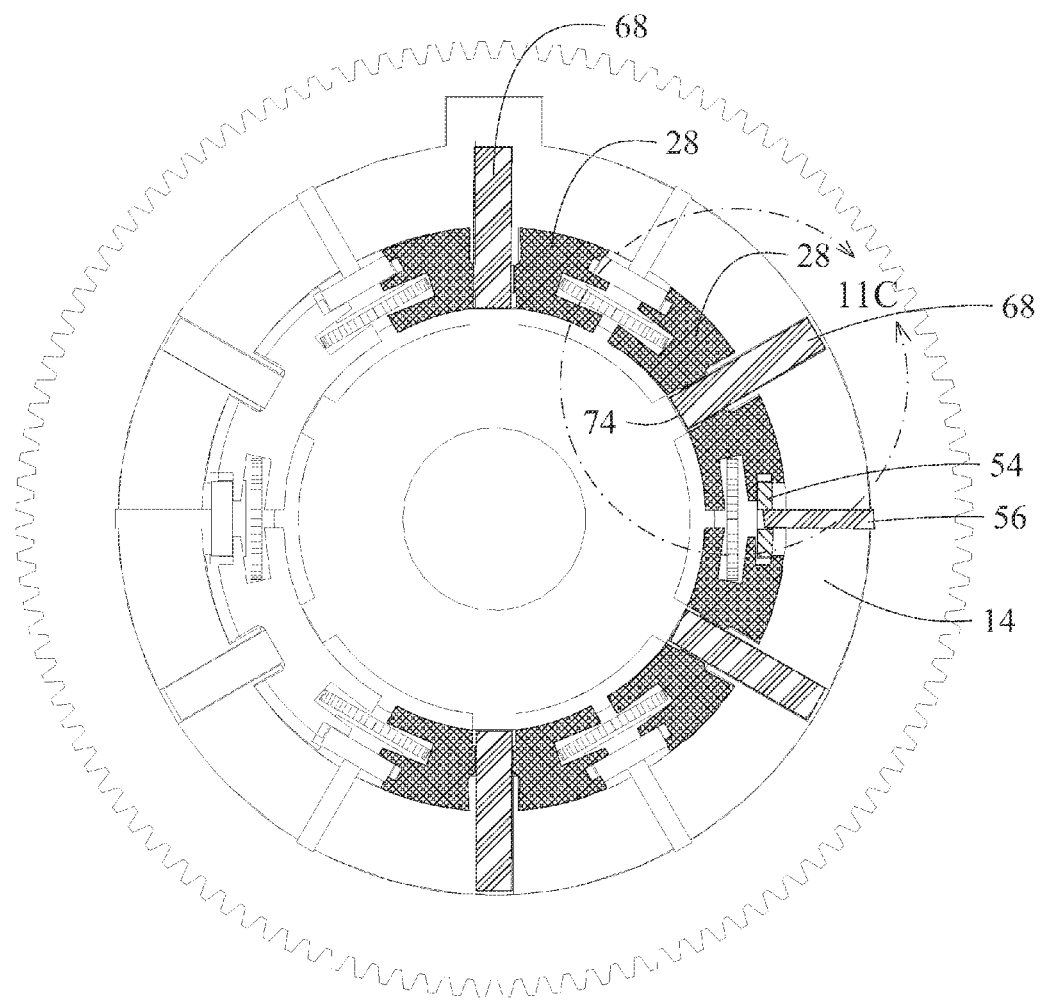
Figure 11C:
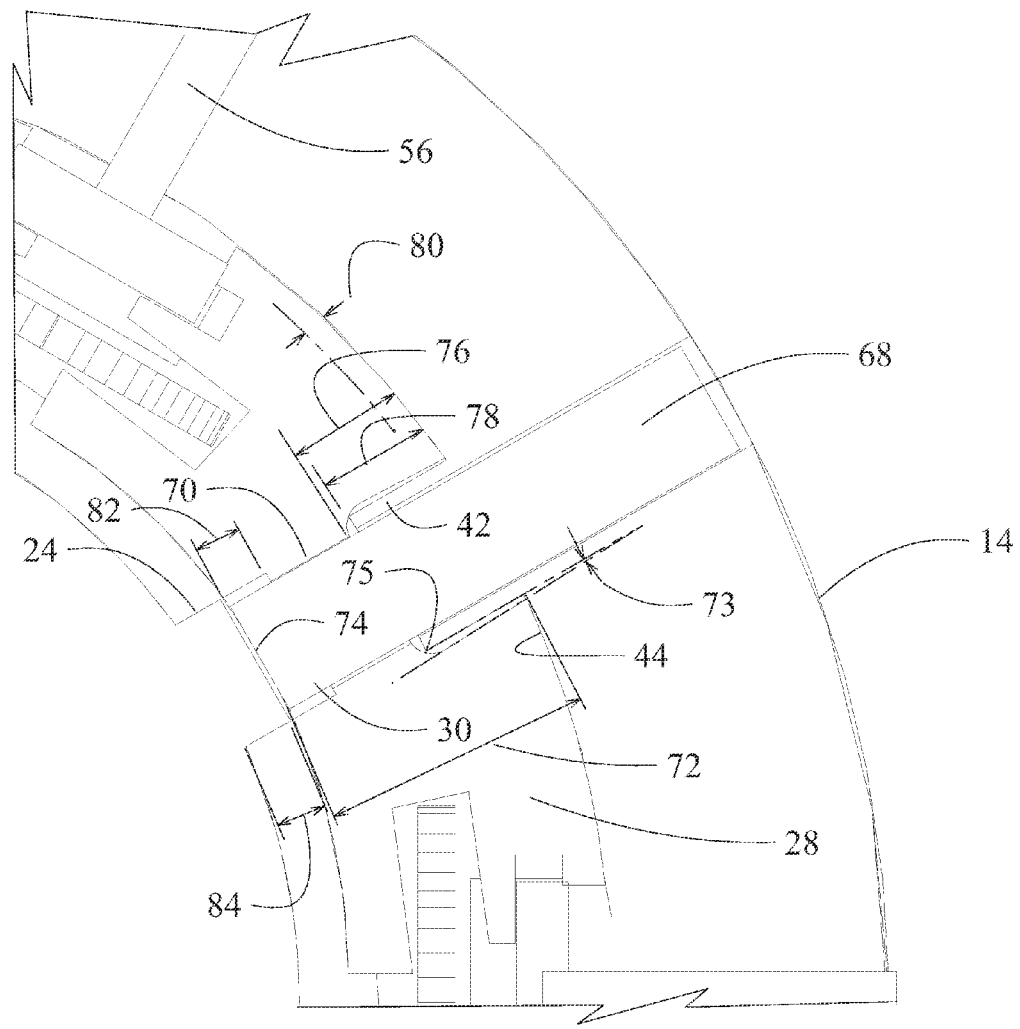

The radially released condition of the EMA is shown in FIGS. 11A, 11B and 11C. As shown, the segments are expanded by the springs for contact with the inner surface 44 of the drive housing 14. To avoid re-engagement of the bosses 24 on the actuation nut 20 and the cavities 30 in the segments 28 if any non-concentricity should arise between the nut and screw assembly and the drive housing with the released segments, blocking pins 68 are received through bores 70 in each segment 28. Bores 70 extend from the engagement slots 38 into the cavities 30 in each segment. Blocking pins 68 extend radially from the inner surface 44 of the drive housing 14 a length 72 to place bottom surface 74 of each pin in circumferential alignment with the inner semi-cylindrical surface of the segment in the released position thereby blocking entry into the cavity by any boss on the actuating nut. For the embodiment shown in the detail of FIG. 11C (without hatching of the sectioned elements for clarity of dimensioning), torque engagement slots 38 are slightly trapezoidal in section, angled from top to bottom at an angle 73 of about 2°, with chamfered or blended bottom corners 75 to allow relief for slight tilting of the segments 28 during expansion over the torque ribs 42 to avoid binding thereby assuring full expansion and jam release.

For operation of the release, the depth 76 of engagement slots 38 is equal to or greater than the height 78 of the ribs 42 from the inner surface 44 of the drive housing 14 plus the radial displacement 80 of the outer semi-cylindrical outer surface 40 of the segments 28 from the active position to the released position against the inner surface 44 of the drive housing 14. The release pins 56 extend radially from the inner surface 44 of the drive housing 14 a distance equal to the radial displacement 80 of the semi-cylindrical outer surface 40 of the segments 28. Boss height 84 is equal to or less than the radial displacement 80 to assure release of the boss 24 from the cavity 30. For the embodiment shown, cavity depth 82 is equal to or greater than boss height 84 to provide maximum engagement of the boss 24 within the cavity 30 in the active position. For the embodiment shown, the release pins 56 and blocking pins 68 are threaded and extend through threaded radial bores in the drive housing 14 for adjustment of depth from the inner surface 44 of the drive housing.

Figure 12:
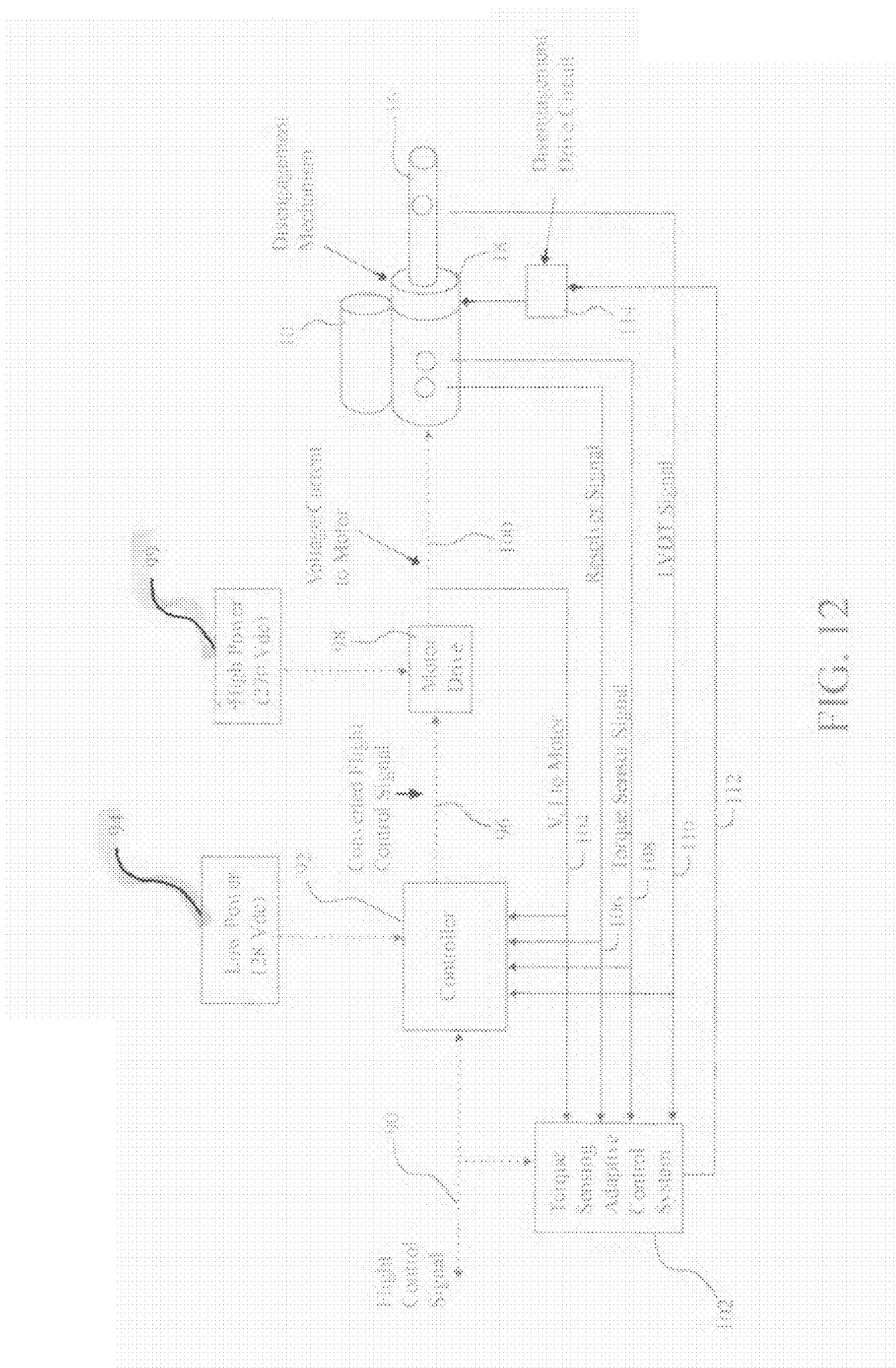
FIG. 12 is a schematic block diagram of the control elements of the EMA system of the disclosed embodiment.

The EMA with the jam release system is incorporated in a mechanical actuation system as shown in FIG. 12 for an exemplary aircraft application. A flight control signal 90 is provided for a desired position of an aircraft control element. The control signal is received by a controller 92 which is powered by a standard 28 Vdc power source 94. The controller provides a converted signal 96 to a motor drive 98 which operates with a high power 270 Vdc input 99. The motor drive provides voltage and current input 100 to the EMA motor 10 which then drives screw 16 to the desired position based on the flight control signal. For system control, feed back and sensing for closed loop control are provided to the controller. The feed back and sensing signals are also provided to a torque sensing adaptive control system 102 which also receives the flight control signal as a reference. A first feedback signal 104 of the voltage and current supplied by the motor drive to the motor, a resolver signal 106 from the motor for position information, a torque sensor signal 108 from the motor and a Linear Variable Displacement Transducer (LVDT) signal 110 from the screw position are provided in the exemplary embodiment. The torque sensing adaptive control system employs the feedback and sensing signals to determine if EMA operation is consistent with the flight control signal or if a jam is present. If a jam is present, the torque sensing adaptive control system provides a jam indication signal 112 to a disengagement drive circuit 114. The disengagement drive circuit then activates the cylindrical piston 66 in disengagement mechanism 18 to slide the push plates for release of the EMA drive system as previously described. For the embodiments shown, the cylindrical piston may be pneumatically driven or activated by an electrical solenoid.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A method for jam release of an electromechanical actuator having a screw and an actuating nut comprising:
   providing a plurality of bosses extending from a circumferential surface of the actuating nut;
   engaging the actuating nut with a segmented expandable drive coupling having a plurality of segments equal to the plurality of bosses, each segment having a cavity to receive a respective one of the plurality of bosses in a first active position with the plurality of segments radially compressed to concentrically engage the bosses;

maintaining the drive coupling in the first active position with a release mechanism;

receiving a control signal indicating a jam; and, releasing the drive coupling from the nut with the release mechanism responsive to the control signal thereby expanding the segmented drive coupling to a second expanded position to disengage the bosses from the cavities.

2. The method as defined in claim 1 wherein the step of releasing comprises:

depressing a plurality of push plates from a first position to a second position, each push plate received for sliding motion in a first groove and second groove, respectively, of adjacent segments of the segmented drive coupling, said push plates in the first position retaining the segments in the first active position and in the second position releasing the segments into the second expanded position.

3. The method as defined in claim 2 further comprising:

providing a plurality of release pins extending radially inward from an inner surface of a drive housing concentrically containing the segmented drive coupling wherein said release pins engage each push plate in the first active position and, upon sliding of the push plates in the grooves to the second expanded position, align with the at least one release hole allowing radial expansion to the released second expanded position for the segmented drive coupling.

4. The method as defined in claim 3 further comprising:

providing a torque sensing adaptive control system;

receiving an input control signal in the torque sensing adaptive control system;

comparing the input control signal to at least one feedback signal from the electromechanical actuator and, upon an unfavorable comparison;

providing the signal indicating a jam.

5. The method as defined in claim 4 wherein the step of providing the signal indicating a jam comprises providing a signal indicating a jam to a disengagement drive circuit.

6. The method as defined in claim 5 wherein the step of depressing a plurality of push plates comprises activating a cylindrical piston to slide the push plates.

7. The method as defined in claim 6 wherein the cylindrical piston is pneumatically driven or activated by an electrical solenoid.

8. The method as defined in claim 2 wherein the plurality of segments each incorporate a cavity adapted to receive a respective one of the plurality of bosses and the step of engaging the actuating nut comprises receiving the respective one of the plurality of bosses in the cavity.

9. The method as defined in claim 2 further comprising engaging a torque engagement slot on each segment by receiving a mating torque rib extending from a cylindrical inner surface of a drive housing.

10. The method as defined in claim 9 further comprising engaging an edge of each segment with an associated dog leg extending from the mating torque rib to constrain the segment in the longitudinal direction.

11. The method as defined in claim 10 further comprising receiving blocking pins through bores in each segment, said bores extending from the engagement slots into the cavities in each segment.

12. The method as defined in claim 11 wherein the step of releasing the nut further comprising aligning a bottom surface of each blocking pin in circumferential alignment with an inner surface of the segment in the released position thereby blocking entry into the cavity by any boss on the actuating nut.

13. The method as defined in claim 6 wherein each push plate includes an end tab and the step of activating a cylindrical piston to slide the push plates further comprises:

depressing the end tabs axially into the segment;

engaging an indented flat on each segment with the end tab for alignment of the release pins and release holes in the second position.

14. The method as defined in claim 3 wherein allowing radial expansion to the second expanded position for the segmented drive coupling further comprises:

constraining separation springs in opposing spring slots in adjacent segments; and urging the segments apart circumferentially.

15. The method as defined in claim 14 wherein the separation springs are selected from the set of wave springs, leaf springs and helical springs.

16. A method for releasing an electromechanical actuator responsive to a jam signal comprising:

providing a plurality of bosses extending from a surface of an actuating nut;

engaging the actuating nut with a concentrically disposed segmented expandable drive coupling having a plurality of segments in a first radially compressed active position by receiving one boss of the plurality of bosses in one of a plurality of cavities in a respective one of the plurality of segments; and, activating a plurality of push plates in operative engagement with the segments, each push plate being received for sliding motion in a first groove and second groove, respectively, of adjacent segments of the segmented drive coupling, wherein the push plates are operative between a first radially compressed active position to engage the bosses in the cavities and a second radially expanded position to disengage the bosses from the cavities.

17. The method as defined in claim 16 further comprising:

extending a plurality of release pins radially inward from an inner surface of a drive housing concentrically containing the segmented drive coupling;

engaging each push plate with a respective release pin in the first radially compressed active position; and, aligning the respective release pins with the at least one release hole upon sliding of the push plates in the grooves to the second radially expanded position, allowing radial expansion of the segmented drive coupling.

18. The method as defined in claim 17 further comprising:

constraining separation springs in opposing spring slots in adjacent segments; and urging the segments apart circumferentially to induce radial expansion.

19. The method as defined in claim 18 further comprising engaging a torque engagement slot on each segment by receiving a mating torque rib extending from an inner surface of a drive housing.

20. The method as defined in claim 19 further comprising aligning a bottom surface of a blocking pin in circumferential alignment with an inner surface of the segment in the second radially expanded position thereby blocking entry into the cavity by any boss on the actuating nut.

* * * * *